Oct. 20, 1959   F. K. H. NALLINGER   2,909,078
METHOD OF CONTROLLING THE OPERATION
OF AN AUTOMOBILE ENGINE
Filed Nov. 1, 1955   2 Sheets-Sheet 1

INVENTOR
FRIEDRICH K. H. NALLINGER

BY  Dicke and Craig

ATTORNEYS

United States Patent Office 2,909,078
Patented Oct. 20, 1959

2,909,078

METHOD OF CONTROLLING THE OPERATION OF AN AUTOMOBILE ENGINE

Friedrich K. H. Nallinger, Stuttgart, Germany, assignor to Daimler-Benz Aktiengesellschaft, Stuttgart-Unterturkheim, Germany Application November 1, 1955, Serial No. 544,324

Claims priority, application Germany November 2, 1954

11 Claims. (Cl. 74—472)

The present invention relates to automobile and similar engines and to a method and apparatus for controlling the operation thereof.

Prior to this invention all regular automobiles, as well as engine-driven rail or cross country vehicles were unnecessarily expensive because their engines, on the one hand, had to produce a high power output and a high torque, while, on the other hand, they had to be able to drive very slowly in the lowest gear. Although this lowest gear is rarely required because of its high torque, it is needed for the low speed which it attains. However, since the driver may occasionally also be able to use the full torque of this gear, it has so far been necessary to make the power transmitting elements, that is, particularly the engine, the gears, and the drive shaft of a strength to comply with such maximum torque.

It is a principal object of the present invention to reduce the weight of the engine and its associated elements and to simplify and reduce the expense of its production and operation.

Another object of the invention is to provide an auxiliary mechanism which is associated with the gear shift mechanism so that it will no longer be necessary to make the power transmitting elements of a strength to accommodate the full torque of the lowest gear.

An important feature of the invention for attaining these objects consists in the provision of means for reducing the maximum output of the engine, that is, the maximum speed thereof or the maximum amount of fuel supplied to it, when such engine is driven in the first gear or in several of the lower gears, as compared with the normal values attained in these gears.

Such limitation of the maximum fuel supply or power output in the first gear may be attained according to the invention by various means, for example, by limiting the stroke of the fuel control member, such as an accelerator, or of a control member for regulating the fuel injection pump, by adjusting the tension of the spring of a centrifugal governor, or by similar means. The advantages attained according to the invention are especially significant if the lowest gear is considerably geared down so as to attain a very low speed.

A further object of the present invention consists in essentially maintaining the good driving qualities which may be attained with a high engine torque, despite the reduction of such torque in the lowest gear.

Another object of the invention consists in reducing the fuel consumption of the engine especially when driven in the lowest gear but also in the higher gears, as well as the wear upon the engine.

For attaining this object, which is of particular advantage in heavy trucks, buses or the like, the maximum output or the maximum speed attainable, or the maximum amount of fuel supplied to the engine may be reduced not only in the lowest gear but also in one or several higher gears, for example, in the highest or the two highest gears. Since the full engine speed and engine output will then be maintained in the middle gears, it will still be possible to overcome steep climbs more quickly and to accelerate the engine whenever necessary, for example, for passing other cars on the road.

A further object of the invention is to provide means for permitting the speed or output of the engine to be used whenever necessary without the limitation thereof as previously described.

Further objects, features, and advantages of the present invention will appear from the following detailed description thereof, as well as from the accompanying drawings, in which:

Fig. 3 shows a modification of the invention as shown in Fig. 1; while

Figure 1:
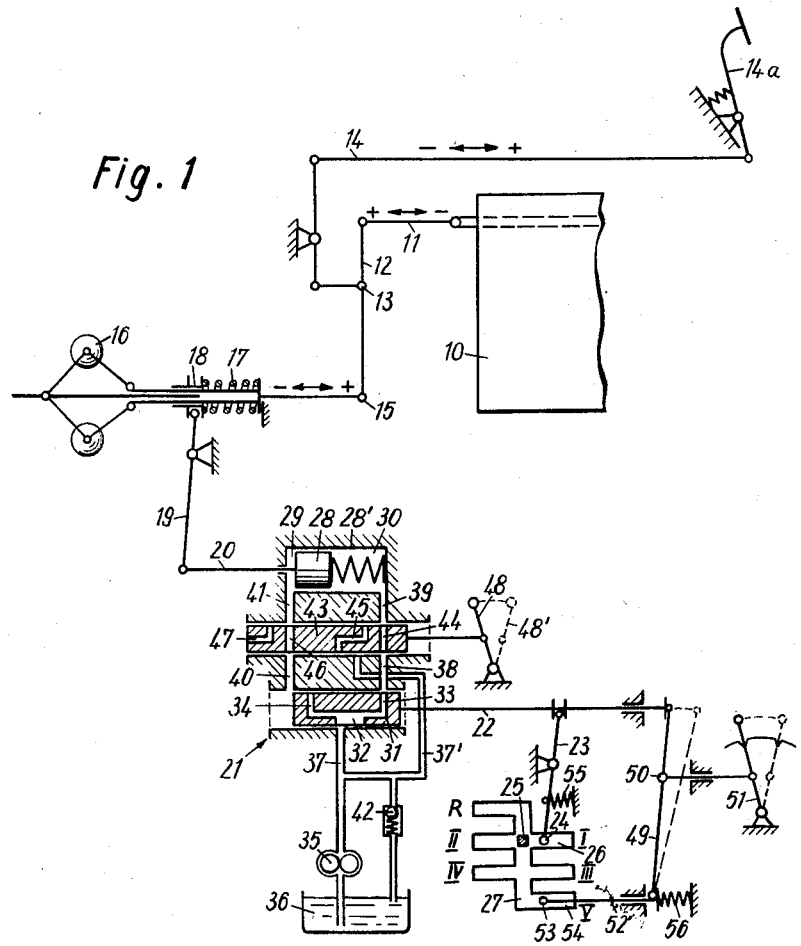
Fig. 1 shows a diagrammatic view of a control mechanism according to the invention for a fuel injection engine which is controlled by means of a speed governor in accordance with the operation and setting of the gear shift mechanism.

Referring to the drawings, Fig. 1 illustrates the injection pump 10 of an internal combustion engine which is controlled in the usual manner by a control rod 11, for example, by turning the pump piston by means of a control rack. Control rod 11 is connected to a lever 12, the pivoting point 13 of which may be adjusted directly either manually or by foot by means of a rod 14 leading, for example, to a gas pedal 14a, or indirectly, or even automatically, for example, by means of a servo arrangement.

A further adjustment of lever 12 may be obtained by means of a speed governor 16 which is controlled by the action of a spring 17 and connected to lever 12 at its outer end 15. The other end of spring 17 acts upon an abutment 18 which is slidably adjustable in axial direction of the spring by means of pivoting rods 19 and 20, the latter of which is connected to a piston 28 of a servo mechanism, generally indicated by the numeral 21, which, in turn, may be adjusted through a connecting rod 22 by a lever 23 which carries a stop member 24 at its outer end. Stop member 24 is slidably mounted in a slot 26 of a gear shift gate 27 where it is engaged by the gear shift lever 25, indicated in cross section, when the latter is shifted into the first gear I of a transmission with, for example, five forward gears I to V and one reverse gear R.

The servo mechanism 21 comprises the double-acting piston 28, the rear side of which is acted upon by a spring and which is slidable in a cylinder 28' and divides the same into two chambers 29 and 30. Servo mechanism 21 further includes a control slide valve 31 with control channels 32, 33, and 34, and a source of pressure, for example, a gear pump 35 which draws a pressure fluid from a container 36 and forces it through the pressure line 37 to control slide valve 31, and then through lines 38 and 39, or 40 and 41, respectively, to one or the other chamber 30 or 29 of cylinder 28'. The pressure supplied to slide valve 31 through line 37 may be regulated, for example, by means of a relief valve 42. The two pairs of inlets and outlets of a by-pass slide valve 43 with control channels 44, 45, 46, 47 may be connected to pressure lines 38, 39, 40, and 41, and may be controlled at will be means of a lever 48. The connecting rod 22 which acts upon slide valve 31 is also in abutting engagement with a lever 49, the pivotal point 50 of which may be adjusted at will, for example, by means of a lever 51 or the like. The other end of lever 49 is pivotally connected to a rod 52 having at one end a stop member 53 slidably mounted in the gate slot 54 of the fifth gear V. Springs 55 and 56 are provided to return levers 23 and 49, respectively, to the position as shown in the drawing.

The fuel supply is normally regulated by operation of the foot pedal 14a through rod 14 in cooperation with the speed governor 16, spring 17 of which then has a constant initial tension. Thus, as long as a certain engine speed is being maintained, the fuel supply is controlled merely by pedal 14a and rod 14, and speed governor 16 will not become operative until the speed of the engine exceeds a certain limit. In the position of the servo mechanism as indicated in Fig. 1, the pressure fluid flows through lines and channels 37, 32, 33, 38, 44, and 39 to cylinder chamber 30, whereby piston 28 will be held in the left position and spring abutment 18 in its right end position, as shown in Fig. 1. Spring 17 is therefore held under a relatively high tension, and such tension remains unchanged as long as one of the intermediate gears, that is, gears II to IV, is engaged, provided it is not varied by the operation of governor 16 or similar means.

If, however, gear shift lever 25 is inserted into gate slot 26 to engage the first gear I, stop member 24 will be pushed back so as to shift control slide 31 toward the left through the movement of rods 23 and 22. As the result of such movement of control slide 31, the pressure now passes through the lines and channels 34, 40, 46, and 41 toward the left cylinder chamber 29, while the chamber 30 on the right side of cylinder 28' will be connected with the atmosphere through the lines and channels 39, 44 and 38. Piston 28 is thereby pushed toward the right so that the tension of spring 17 will be reduced. Thus, even at a comparatively low speed of the engine, governor 16 will become operative and reduce the function of the fuel pump.

If desired, instead of acting directly upon control rod 11 of fuel pump 10 through lever 12 or a similar intermediate member, accelerator rod 14 may also act upon the control spring 17 of governor 16. In such a case, the maximum speed or maximum engine output attainable may also be reduced when the first gear I is being engaged.

A similar action occurs if the fifth gear V is engaged and gear shift lever 25 pushes stop member 53 toward the right, thereby pivoting lever 49 about its pivotal point 50 and shifting control slide 31 toward the left. By shifting the pivotal point 50 by means of lever 51 to the position indicated in dot-and-dash lines, lever 49 may be withdrawn from its engagement with rod 22 and thus rendered inoperative so that the fuel pump supplying action will not be reduced when the fifth gear is engaged.

A similar adjustment may also be provided to render lever 23 ineffective so that the servo mechanism 21 will not act upon fuel pump 10 to reduce the fuel supply when the first gear is being engaged.

Figure 2:
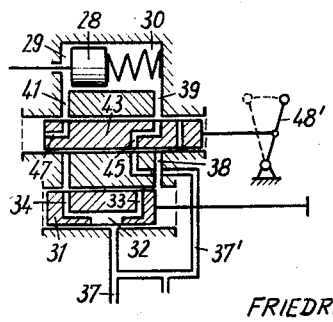
Fig. 2 shows the same control mechanism but with the servo arrangement in a different position.

If by-pass slide 43 is shifted by means of lever 48 toward the right side position 48', as shown in Fig. 2, the right cylinder chamber 30 will always be connected with pressure line 37' through line 39 and channel 45, while the left cylinder chamber 29 will be connected through line 41 and channel 47 to the atmosphere. Thus, regardless of the position of adjustment of slide 31, piston 28 may in any case be held in its left end position so that spring 17 will be held under full tension.

Figure 3:
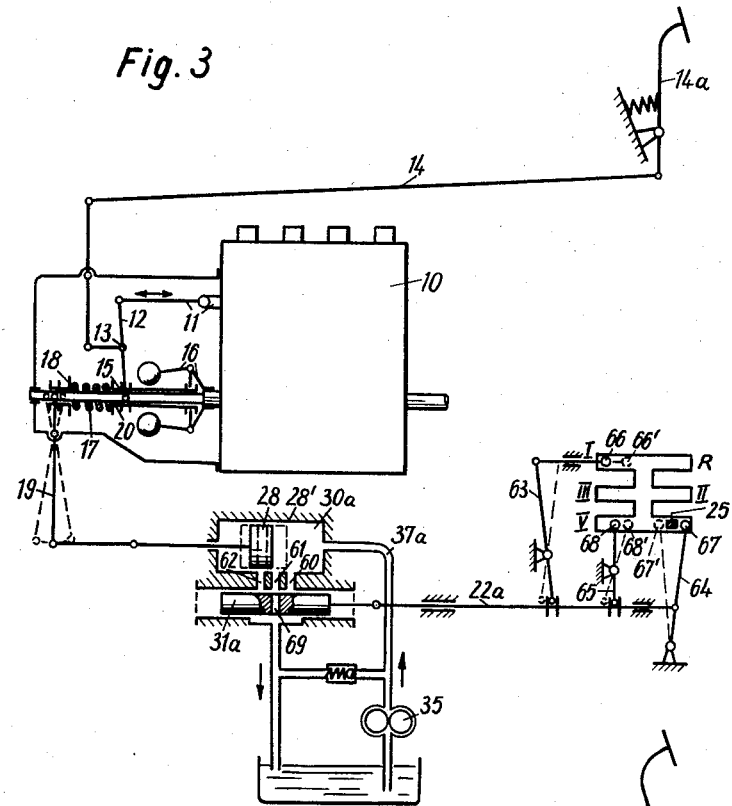

Fig. 3 illustrates a modified arrangement of the control mechanism according to the invention, in which the piston 28 may be adjusted to any one of three positions so that the control spring 17 may be adjusted to any one of three different tensions. Pump 35 supplies oil under pressure through line 37a into the pressure side 30a of cylinder 28' which is connected through three lines 60, 61, and 62 with the cylinder of control slide 31a. The connecting rod 22a thereof is connected to levers 63, 64, and 65, of which lever 63 carries a stop member 66 which is acted upon by gear shift lever 25 in the gate slot for the first gear I, while lever 64 carries a stop member 67 for the fourth gear IV, and lever 65 a stop member 68 for the fifth gear V. By suitable placement of their pivotal points, levers 63, 64, and 65 are also given different transmission ratios so that, when the fifth gear V is engaged, rod 22a carries out a larger stroke, for example, twice as large, as when the first or fourth gears are engaged. Thus, when gear shift lever 25 is placed in neutral or shifted to the second or third gears and stop members 66, 67, and 68 assume the positions 66', 67', and 68', respectively, control slide 31a will be in its left end position in which control channel 69 communicates with line 62, while when the first or fourth gears are engaged, control slide 31a will be in its central position in which control channel 69 communicates with line 61, and when the fifth gear is engaged, control slide 31a will be in its right end position in which control channel 69 communicates with line 60. Since piston 28 always shifts so far toward the left that it frees the respective line 62, 61, or 60 which, in turn, communicates with the control channel 69, spring 17 will be under its maximum tension in the second and third gears, but under a smaller tension in the first and fourth gears, and under its lowest tension in the fifth gear. Therefore, in the first and fourth gears the speed governor 16 will react at a speed lower than that where it would normally react in these gears, while in the fifth gear such speed will be still lower.

If the maximum speed attainable by the engine in the second and third gears is, for example, 3000 r.p.m., the maximum speed attainable in the second and fourth gears may be limited to 2500 r.p.m., while in the fifth gear the maximum speed may be 2000 r.p.m.

Evidently, the arrangement may also be such that the engine speed attainable in the first gear will be no higher than that attainable in the fifth gear.

Figure 4:
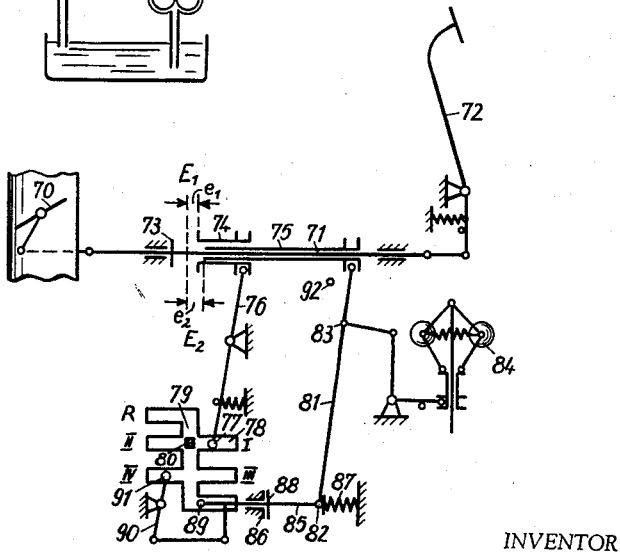
Fig. 4 shows the control mechanism according to the invention as applied to a carburetor engine which is provided with an accelerator which is operated in accordance with the setting of the gear shift mechanism.

In the embodiment of the invention as illustrated diagrammatically in Fig. 4, the engine may be controlled by means of an accelerator 70 which is connected to foot pedal 72 by a rod 71. Lever 81 is pivotally mounted at 83 and in engagement at one end with a rod 85 which is slidably mounted, for example, in a bushing 86, and urged toward the left into engagement with a stop member 88 by a spring 87. Rod 85 carries at its other end a stop member 89 and may, if desired, be further connected with another stop member 91 through a reversing lever 90. Stop members 91 and 89 may be disposed, for example, in the gate slots for the fourth and fifth gears IV and V, respectively, of gate 79. The arrangement may, for example, be such that when the gear shift lever 80 is shifted to engage the fourth gear, rod 85 will carry out a smaller stroke than when the fifth gear is engaged so that the accelerator 70 will be further opened and a higher engine output will be obtained than in the fifth gear.

If the first gear is engaged by shifting the gear shift lever 80 into the gate slot 78, lever 76 will then shift the stop sleeve 74 a distance $e_1$ toward the left and to the position $E_1$. Consequently, when foot pedal 72 is depressed to open accelerator 70, stop member 73 will engage with stop sleeve 74 sooner than when the latter is in its normal retracted position, so that accelerator 70 cannot attain its fully open position.

If the fifth or fourth gear is engaged, gear shift lever 80 shifts stop member 89 or 91, respectively, toward the outer ends of their gate slots and thereby rod 85 toward the right against the action of spring 87. Lever 81 will then be pivoted about its pivotal point 83 so that the other end thereof will shift the stop sleeve 75 toward the left.

A similar adjustment of stop sleeve 75 will be produced if governor 84 exceeds a certain maximum speed, thereby shifting the pivotal point 83 and thus rod 81 toward the left.

The adjustment of stop sleeve 75 toward the left moves the same in the direction toward the stop member 73 on rod 71 so that accelerator 70 cannot be fully opened. The relative dimensions of the individual rods may, for example, be such that, when stop sleeve 75 is adjusted by gear shift lever 80, as well as at the same time by governor 84, stop sleeve 75 will carry out a stroke $e_2$ and move to the point $E_2$. If desired, a stop 92 may also be provided to limit the stroke of lever 81 or of stop sleeve 75.

Furthermore, if desired, a resilient mechanism may be connected between gas pedal 72 and rod 71 so that pedal 72 may be fully depressed without moving accelerator 70, which is limited by stop sleeve 74 or 75, to its fully open position. Stop sleeves 74 and 75 may also be provided in a different arrangement than that shown and cooperate with separate stops on rod 71. Similar modifications may also be applied to the embodiment of the invention as shown in Fig. 1.

The fuel supply may, according to the invention, also be regulated in accordance with the shifting of the gears by electric, hydraulic, pneumatic, or similar means, or a combination of several such means.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In combination with an automobile engine and particularly those used for vehicles operating at low speeds having a plurality of changeable gears, a gear shift member for alternately engaging one of said gears, means for regulating the output of said engine, means operatively associated with said regulating means for limiting the output of said engine from exceeding a certain value, and control means interposed between said gear shift member and said regulating means for controlling said regulating means so as to vary said output limit, said control means being disposed relative to said gear shift member so that, when said gear shift member engages a lower gear, said control means limits said regulating means to a lower output limit than when said gear shift member engages a next higher gear.

2. In combination with an automobile engine and particularly those used for vehicles operating at low speeds having a plurality of changeable gears including at least one lower gear, an intermediate gear, and a higher gear, a gear shift member for alternately engaging one of said gears, means for regulating the output of said engine, means operatively associated with said regulating means for limiting the output of said engine from exceeding a certain value, and control means interposed between said gear shift member and said regulating means so as to vary said output limit, said control means being disposed relative to said gear shift member so that when said gear shift member alternately engages said lower gear and said higher gear, said control means limits said regulating means to a lower output limit than when said gear shift member engages said intermediate gear.

3. In a combination as defined in claim 1, wherein said output limiting means comprise a speed governor including spring means operatively connected with said output regulating means, and means adjustable in accordance with the speed of said engine for adjusting said output regulating means to a lower output against the action of said spring means when the speed of said engine increases, and wherein said control means comprises an adjustable bearing for supporting spring means, means for adjusting said bearing so as to reduce the tension of said spring means and thus reduce the attainable limit of the engine output even at a lower engine speed, when said adjusting means are adjusted by said gear shift member when the latter engages said lower gears.

4. In a combination as defined in claim 3, wherein said control means further comprise a movable stop member adapted to be engaged and adjusted by said gear shift member when said member is moved to a position to engage said lower gear, and motion transmitting means for transmitting the movement of said stop member to said spring bearing so that when said stop member is adjusted by said gear shift member when the latter is moved to the position to engage said lower gear, said spring bearing is adjusted to reduce the tension of said spring means.

5. In a combination as defined in claim 4, wherein said motion transmitting means comprise a control member connected to and moved together with said adjustable stop, a pressure system, and a pressure motor including a movable motor element connected with said spring bearing, said control member being adapted to control the connection of said pressure system with said pressure motor.

6. In a combination as defined in claim 1, further comprising an arbitrarily adjustable member, and means connecting said last member with said control means and adapted to adjust said output limiting means so as to vary said output limit when said adjustable member is adjusted independently of said gear shift member.

7. In a combination as defined in claim 1, further comprising an arbitrarily adjustable member, and means connecting said last member with said control means and adapted by the adjustment of said adjustable member to eliminate the controlling action of said gear shift member upon said output limiting means.

8. In a combination as defined in claim 5, further comprising an arbitrarily adjustable member, said connecting means comprising a second control member connected to and movable with said arbitrarily adjustable member and adapted to control the connection of said pressure system with said pressure motor independently of said first control member.

9. In a combination as defined in claim 2, wherein said control means are arranged so as to adjust said output limiting means to a different output limit when said higher gear is being engaged than when said lower gear is being engaged.

10. In combination with an automobile engine and particularly those used for vehicles operating at low speeds having a plurality of changeable gears including at least one low gear, a lower middle gear, an upper middle gear, and a high gear, a gear shift member for alternately engaging one of said gears, means for regulating the output of said engine, a speed governor operatively connected with said output regulating means and adapted to adjust the same so as to reduce the output of said engine when the latter exceeds a certain speed, a first movable stop member adapted to be engaged by said gear shift member when the latter engages the lower gear, a second movable stop member adapted to be engaged by said gear shift member when the latter engages upper middle gear, and a third stop member adapted to be engaged by said gear shift member when the latter engages said high gear, motion transmitting means for transmitting the movements of said stop members to said speed governor and for adjusting the same when said stop members are being adjusted, said stop members being arranged so as to adjust said governor to a lower maximum speed when said gear shift member is shifted to engage said high gear than when said gear shift member is shifted to engage said upper middle gear.

11. In combination with an automobile engine and particularly those used for vehicles operating at low speeds having a plurality of changeable gears, a gear shift member for alternately engaging one of said gears, means for regulating the output of said engine, means for limiting the position of said output regulating means so that said engine will not exceed a certain maximum output, stop means operatively connected with said limiting means and cooperating with said gear shift member so that when the latter is shifted to engage a lower gear, said stop means will adjust said limiting means to a position where said output regulating means are limited to a lower output than when said gear shift member is shifted to engage a higher gear.

References Cited in the file of this patent
UNITED STATES PATENTS 2,719,437 Nallinger _____ Oct. 4, 1955